United States Patent
Cucci et al.

(10) Patent No.: US 11,774,686 B2
(45) Date of Patent: Oct. 3, 2023

(54) EDGE COUPLERS INCLUDING A ROUNDED REGION ADJACENT TO AN OPENING IN THE INTERCONNECT STRUCTURE

(71) Applicant: GLOBALFOUNDRIES U.S. Inc., Santa Clara, CA (US)

(72) Inventors: Brett Cucci, Colchester, VT (US); Yusheng Bian, Ballston Lake, NY (US); Abdelsalam Aboketaf, Essex Junction, VT (US); Edward Kiewra, South Burlington, VT (US); Robert K. Leidy, Burlington, VT (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 87 days.

(21) Appl. No.: 17/313,472

(22) Filed: May 6, 2021

(65) Prior Publication Data

US 2022/0357530 A1    Nov. 10, 2022

(51) Int. Cl.
*G02B 6/42*    (2006.01)

(52) U.S. Cl.
CPC .................. *G02B 6/4206* (2013.01)

(58) Field of Classification Search
CPC .................................................. G02B 6/42
USPC .......................................................... 385/49
See application file for complete search history.

(56) References Cited

U.S. PATENT DOCUMENTS

| | | | |
|---|---|---|---|
| 6,297,168 B1 | 10/2001 | Shieh et al. | |
| 6,343,171 B1 * | 1/2002 | Yoshimura | H01L 23/5389 385/24 |
| 6,540,885 B1 * | 4/2003 | Keil | H01L 21/31116 257/E21.252 |
| 6,611,635 B1 * | 8/2003 | Yoshimura | H01L 24/96 257/E25.032 |
| 6,684,007 B2 * | 1/2004 | Yoshimura | G02B 6/43 257/E25.032 |
| 6,690,845 B1 * | 2/2004 | Yoshimura | G02B 6/124 257/E25.032 |

(Continued)

FOREIGN PATENT DOCUMENTS

| | | | | |
|---|---|---|---|---|
| CN | 101414590 A | * | 4/2009 | ......... H01L 23/3128 |
| CN | 101432649 A | * | 5/2009 | ......... G02B 6/12007 |

OTHER PUBLICATIONS

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

(Continued)

*Primary Examiner* — Kaveh C Kianni
(74) *Attorney, Agent, or Firm* — Thompson Hine LLP; Anthony Canale (57) ABSTRACT

Structures for an edge coupler of a photonics chip and methods of forming an edge coupler for a photonics chip. The structure includes a waveguide core on a dielectric layer, as well as an interconnect structure including a interlayer dielectric layer positioned over the dielectric layer and an opening penetrating through the interlayer dielectric layer to the waveguide core. A region of the interlayer dielectric layer is positioned to overlap with a portion of the waveguide core. The region of the interlayer dielectric layer has a surface that is rounded with a curvature.

20 Claims, 8 Drawing Sheets

(56) References Cited

U.S. PATENT DOCUMENTS

| | | | |
|---|---|---|---|
| 6,845,184 B1* | 1/2005 | Yoshimura | H01L 23/48 385/9 |
| 7,109,085 B2 | 9/2006 | Wang et al. | |
| 7,749,914 B2 | 7/2010 | Honda et al. | |
| 10,816,726 B1* | 10/2020 | Peng | G02B 6/3636 |
| 2002/0003264 A1 | 1/2002 | Chan et al. | |
| 2002/0028045 A1* | 3/2002 | Yoshimura | H01L 23/5389 385/39 |
| 2002/0039464 A1* | 4/2002 | Yoshimura | H01L 24/24 257/E25.032 |
| 2002/0097962 A1* | 7/2002 | Yoshimura | G02B 6/124 385/16 |
| 2007/0274630 A1* | 11/2007 | Ghiron | G02B 6/4231 385/33 |
| 2013/0114924 A1* | 5/2013 | Loh | G02B 6/12 385/33 |
| 2015/0277036 A1* | 10/2015 | Jiang | G02B 6/136 438/69 |
| 2016/0005775 A1* | 1/2016 | Ellis-Monaghan | H01L 27/1462 257/446 |
| 2016/0248216 A1* | 8/2016 | Purnawirman | H01S 3/0637 |
| 2016/0291265 A1* | 10/2016 | Kinghorn | G02B 6/4238 |
| 2020/0006088 A1* | 1/2020 | Yu | G02B 6/136 |
| 2021/0157052 A1* | 5/2021 | Tai | G02B 6/43 |
| 2021/0271020 A1* | 9/2021 | Islam | H01L 25/18 |
| 2021/0313254 A1* | 10/2021 | Chen | H01L 23/49503 |
| 2022/0043208 A1* | 2/2022 | Hsia | G02B 6/4242 |
| 2022/0155539 A1* | 5/2022 | Pietambaram | G02B 6/4248 |
| 2022/0276452 A1* | 9/2022 | Freedman | G02B 6/4206 |
| 2022/0381985 A1* | 12/2022 | Hsia | G02B 6/124 |

OTHER PUBLICATIONS

Y. Bian, et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.

* cited by examiner

EDGE COUPLERS INCLUDING A ROUNDED REGION ADJACENT TO AN OPENING IN THE INTERCONNECT STRUCTURE

BACKGROUND

The present invention relates to photonics chips and, more specifically, to structures for an edge coupler of a photonics chip and methods of forming an edge coupler for a photonics chip.

Photonics chips are used in many applications and systems including, but not limited to, data communication systems and data computation systems. A photonics chip integrates optical components, such as waveguides, optical switches, optical power splitters, and directional couplers, and electronic components, such as field-effect transistors, into a unified platform. Among other factors, layout area, cost, and operational overhead may be reduced by the integration of both types of components on the same chip.

An edge coupler, also known as a spot-size coupler, is commonly used for coupling light of a given mode from an optical fiber to optical components on the photonics chip. The edge coupler may include a section of a waveguide core that is located adjacent to the edge of the photonics chip. The waveguide core routes the light away from the edge coupler to the optical components of the photonics chip.

Processing with reactive ion etching (ME) is susceptible to micro-trenching along the borders of features that tend to enhance the vertical etch rate. High-energy reactive ion etching processes and relatively large features may be more prone to the occurrence of micro-trenching. A portion of the back-end-of-line stack may be completely removed with a high-energy reactive ion etching process to define an opening that may be used in the construction of a fiber-to-chip coupler. The opening penetrates fully through the back-end-of-line stack and reveals a portion of a waveguide core adjacent to the boundary of the opening. Because of the occurrence of micro-trenching, the high-energy reactive ion etching process forming the opening may erode and damage the revealed portion of the waveguide core after penetrating through the back-end-of-line stack, which is an undesired process artifact.

Improved structures for an edge coupler of a photonics chip and methods of forming an edge coupler for a photonics chip are needed.

SUMMARY

In an embodiment of the invention, a structure includes a dielectric layer, a waveguide core on the dielectric layer, and an interconnect structure including a interlayer dielectric layer positioned over the dielectric layer and an opening penetrating through the interlayer dielectric layer to the waveguide core. The interlayer dielectric layer includes a region positioned to overlap with a portion of the waveguide core. The region of the interlayer dielectric layer has a surface that is rounded with a curvature.

In an embodiment of the invention, a method includes forming a waveguide core on a dielectric layer, forming an interconnect structure including a interlayer dielectric layer positioned over the dielectric layer, and forming an opening penetrating through the interlayer dielectric layer to the waveguide core. The interlayer dielectric layer includes a region positioned to overlap with a portion of the waveguide core. The region of the interlayer dielectric layer has a surface that is rounded with a curvature.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
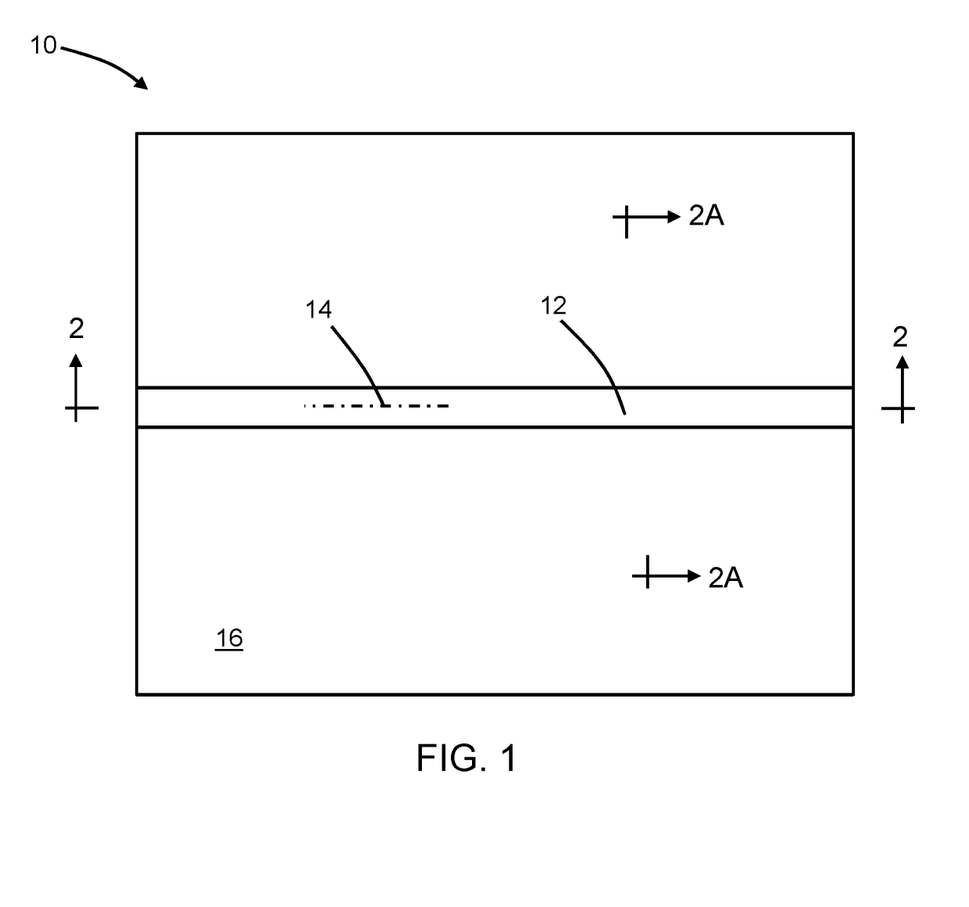
FIG. 1 is a top view of a structure at an initial fabrication stage of a processing method in accordance with embodiments of the invention.
Figure 2:
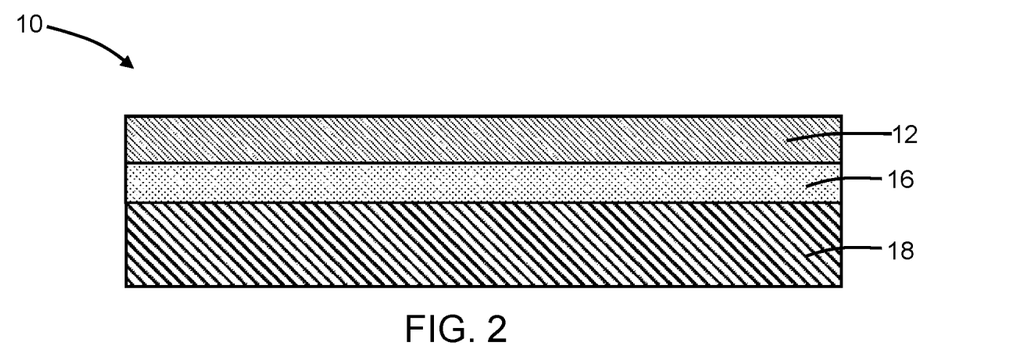
FIG. 2 is a cross-sectional view of the structure taken generally along line 2-2 in FIG. 1.
Figure 2A:
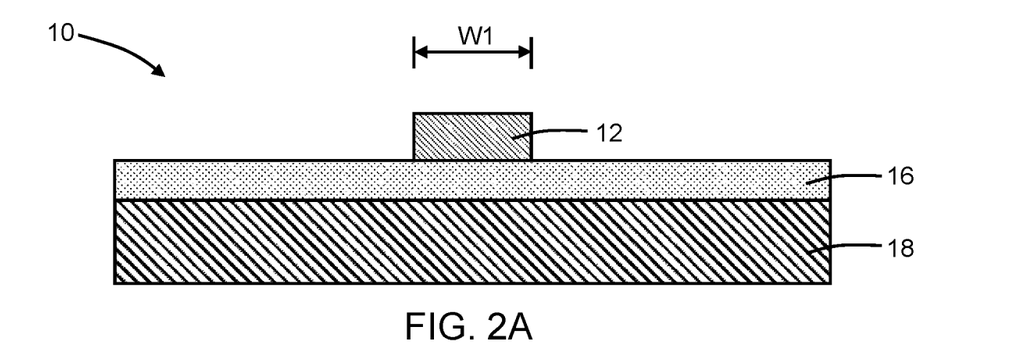
FIG. 2A is a cross-sectional view of the structure taken generally along line 2A-2A in FIG. 1.

With reference to FIGS. 1, 2, 2A and in accordance with embodiments of the invention, a structure 10 includes a waveguide core 12 that may be positioned over a dielectric layer 16 and aligned along a longitudinal axis 14. The waveguide core 12 may be comprised of a semiconductor material, such as single-crystal silicon. In an embodiment, the semiconductor material may originate from a device layer of a silicon-on-insulator (SOI) substrate that further includes a buried oxide layer providing the dielectric layer 16 and a substrate 18 comprised of a semiconductor material, such as single-crystal silicon. The waveguide core 12 may be formed by patterning the device layer with lithography and etching processes during front-end-of-line processing. In an embodiment, the waveguide core 12 may be positioned in direct contact with the dielectric layer 16. The waveguide core 12 may have a width dimension W1 in a direction transverse to the longitudinal axis 14. In an embodiment, the waveguide core 12 may be tapered over at least a portion of the structure 10.

Figure 3:
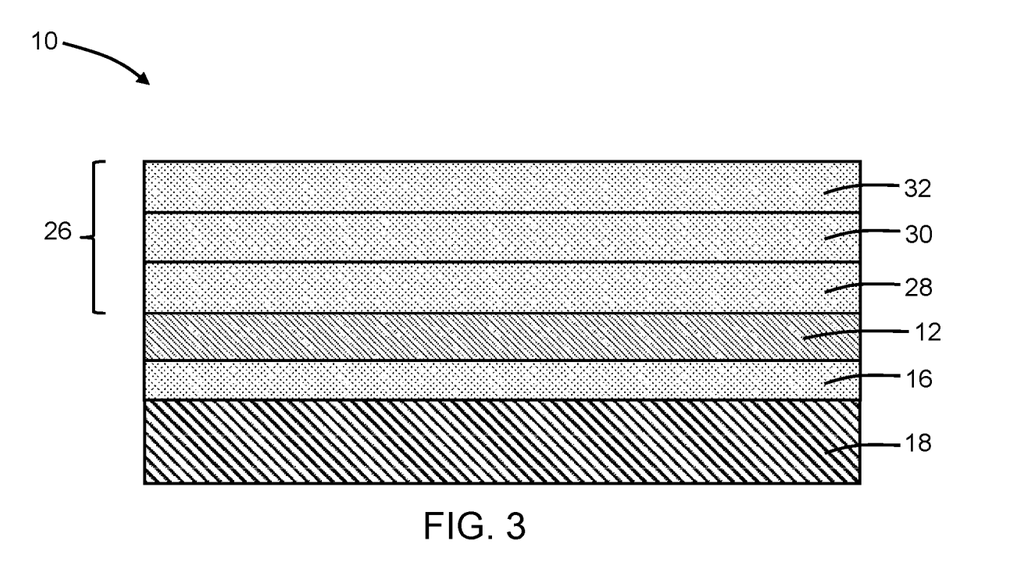
FIGS. 3, 3A are cross-sectional views of the structure at a fabrication stage subsequent to FIGS. 2, 2A.
Figure 3A:
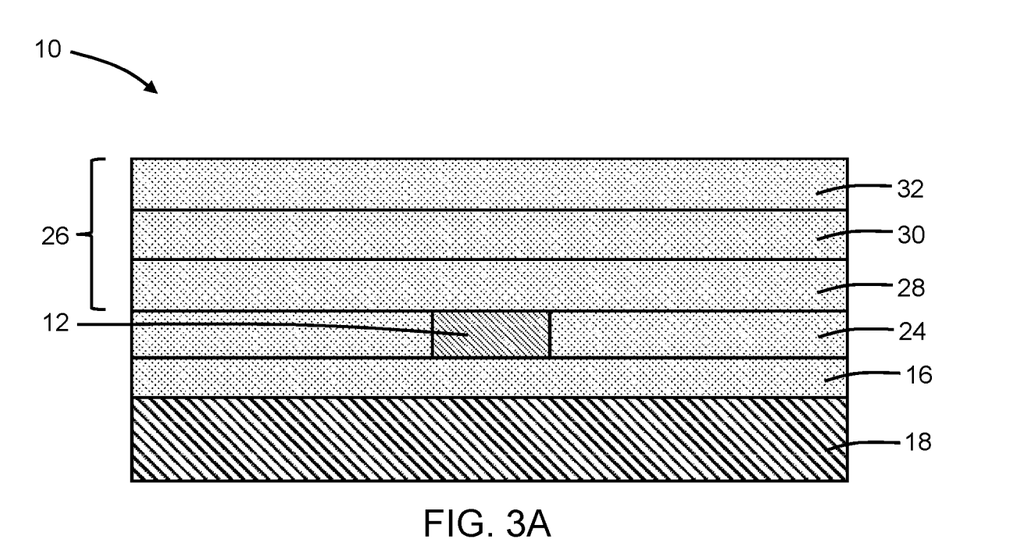

With reference to FIGS. 3, 3A in which like reference numerals refer to like features in FIGS. 2, 2A and at a subsequent fabrication stage, a dielectric layer 24 may be formed over the waveguide core 12 and the dielectric layer 16. The dielectric layer 24 may be comprised of silicon dioxide that is deposited by chemical vapor deposition and planarized with chemical-mechanical polishing. The dielectric layer 24 may provide low-index cladding at the sides of the waveguide core 12.

An interconnect structure 26 may be formed by back-end-of-line processing that includes multiple wiring levels that are positioned over the dielectric layers 16, 24 and waveguide core 12. The interconnect structure 26 includes multiple interlayer dielectric layers 28, 30, 32 in each of which lines and vias may be formed by a damascene process to define the different wiring levels. Specifically, each of the interlayer dielectric layers 28, 30, 32 may be deposited and patterned using lithography and etching processes to define trenches and via openings that are lined with a barrier layer (e.g., a bilayer of tantalum and tantalum nitride) and filled by a planarized conductor (e.g., copper or aluminum) to define lines and vias that connect the lines in different wiring levels. Each of the interlayer dielectric layers 28, 30, 32 of the interconnect structure 26 may be comprised of a dielectric material, such as silicon dioxide, silicon nitride, or a low-k dielectric material, that is deposited by, for example, chemical vapor deposition. The number of interlayer dielectric layers 28, 30, 32 may vary depending upon the number of wiring levels in the interconnect structure 26. In the representative embodiment, the interlayer dielectric layer 28 is positioned directly over the dielectric layer 24 and waveguide core 12, the interlayer dielectric layer 30 is positioned directly over the interlayer dielectric layer 28, and the interlayer dielectric layer 32 is positioned directly over the interlayer dielectric layer 30.

With reference to FIGS. 4, 5, 5A, 5B in which like reference numerals refer to like features in FIGS. 3, 3A and at a subsequent fabrication stage, an opening 42 is formed that penetrates fully through the interlayer dielectric layers 28, 30, 32. In the representative embodiment, the opening 42 may have a bottom at the level of the waveguide core 12 and the dielectric layer 24. The opening 42 may be formed by lithography and etching processes. In an embodiment, the etching process may be a reactive ion etching process that uses a chemically-reactive plasma to remove an unmasked portion of each of the interlayer dielectric layers 28, 30, 32 to form the opening 42. In an embodiment, the depth of the opening 42 may be equal to the sum of the thicknesses of the interlayer dielectric layers 28, 30, 32.

The patterned interlayer dielectric layers 28, 30, 32 each include a rounded region 36 that is located adjacent to the opening 42. Each rounded region 36 is laterally positioned along a sidewall of the opening 42 between a region 38 and a region 40. A revealed portion 22 of the waveguide core 12 protrudes from beneath the rounded regions 36 of the interlayer dielectric layers 28, 30, 32 and is located inside the opening 42. The rounded regions 36 of the interlayer dielectric layers 28, 30, 32 are positioned to overlap with a portion 20 of the waveguide core 12 that is covered by the interconnect structure 26 after the formation of the opening 42. The overlapped portion 20 of the waveguide core 12 is arranged between the dielectric layer 16 and the rounded regions 36 of the interlayer dielectric layers 28, 30, 32.

The rounded region 36 of the interlayer dielectric layer 28 includes a surface 29 that is curved or rounded with a curvature, the rounded region 36 of the interlayer dielectric layer 30 includes a surface 31 that is curved or rounded with a curvature, and the rounded region 36 of the interlayer dielectric layer 32 includes a surface 33 that is curved or rounded with a curvature. The regions 38, 40 may have substantially planar or flat surfaces bordering the opening 42 adjacent to the surfaces 29, 31, 33. In an embodiment, the rounded regions 36 may have a width dimension W2 that is greater than the width dimension W1 of the waveguide core 12 (FIG. 2) at the location of the surfaces 29, 31, 33. The overlapped portion 20 and the revealed portion 22 of the waveguide core 12 are positioned along the longitudinal axis 14 on opposite sides of the surfaces 29, 31, 33.

In an embodiment, the curvatures of the surfaces 29, 31, 33 of the rounded regions 36 of the interlayer dielectric layers 28, 30, 32 may be equal to each other. In an embodiment, the curvatures of the surfaces 29, 31, 33 of the rounded regions 36 of the interlayer dielectric layers 28, 30, 32 may be substantially equal to each other. In an embodiment, the surfaces 29, 31, 33 of the rounded regions 36 may be characterized by a positive radius of curvature. In an embodiment, the surfaces 29, 31, 33 of the rounded regions 36 may have a central angle θ that is equal to 90°. In an embodiment, the surfaces 29, 31, 33 of the rounded regions 36 may have a central angle θ that is approximately equal to 90°. In an embodiment, the surfaces 29, 31, 33 of the rounded regions 36 may have a central angle θ that ranges from about 90° to about 180°. In an embodiment, each rounded region 36 may be characterized as a section of a cylinder. In an embodiment, each rounded region 36 may be characterized as a sector of a right circular cylinder. In an embodiment, each rounded region 36 may be characterized as a sector of a right circular cylinder equal to one-quarter of an entire right circular cylinder. In an embodiment, each rounded region 36 may be characterized as a sector of a rounded three-dimensional shape different from a right circular cylinder.

The rounded regions 36 of the interlayer dielectric layers 28, 30, 32 may alleviate damage to the revealed portion 22 of the waveguide core 12 when etching with reactive ion etching through the interconnect structure 26 to form the opening 42. In that regard, the rounded regions 36 of the interlayer dielectric layers 28, 30, 32 may generate a local shift in the vertical etch rate component above the revealed portion 22 of the waveguide core 12 as the opening 42 is formed. For example, the rounded regions 36 of the interlayer dielectric layers 28, 30, 32 may reduce micro-trenching by locally deflecting energetic ions of the chemically-reactive plasma away from the location of the transition between the overlapped portion 20 and revealed portion 22 of the waveguide core 12. The rounded regions 36 may be introduced by a minor design layout change in the etch mask and may provide protection independent of the etching process and equipment.

Figure 5:
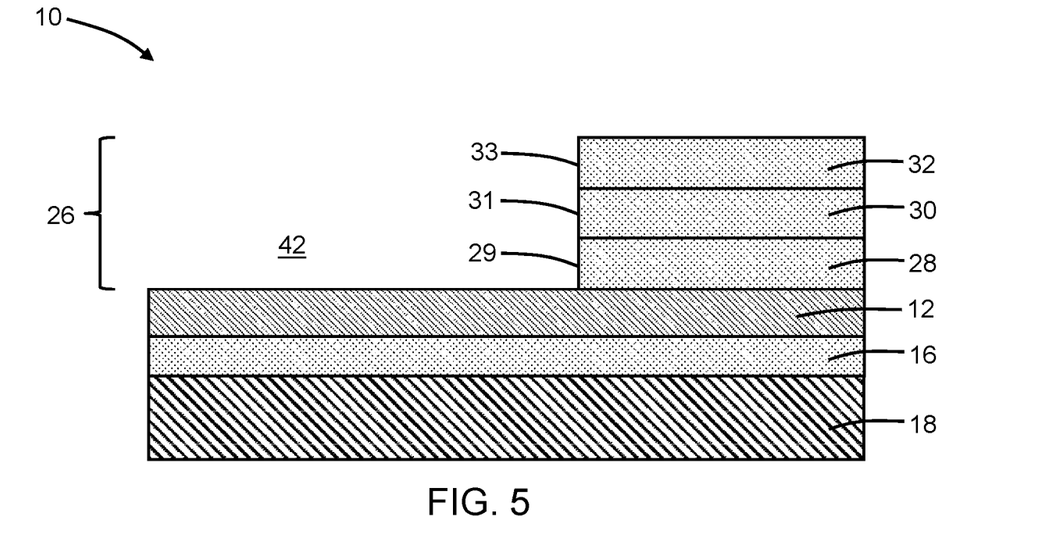
FIG. 5 is a cross-sectional view of the structure taken generally along line 5-5 in FIG. 4.
Figure 5A:
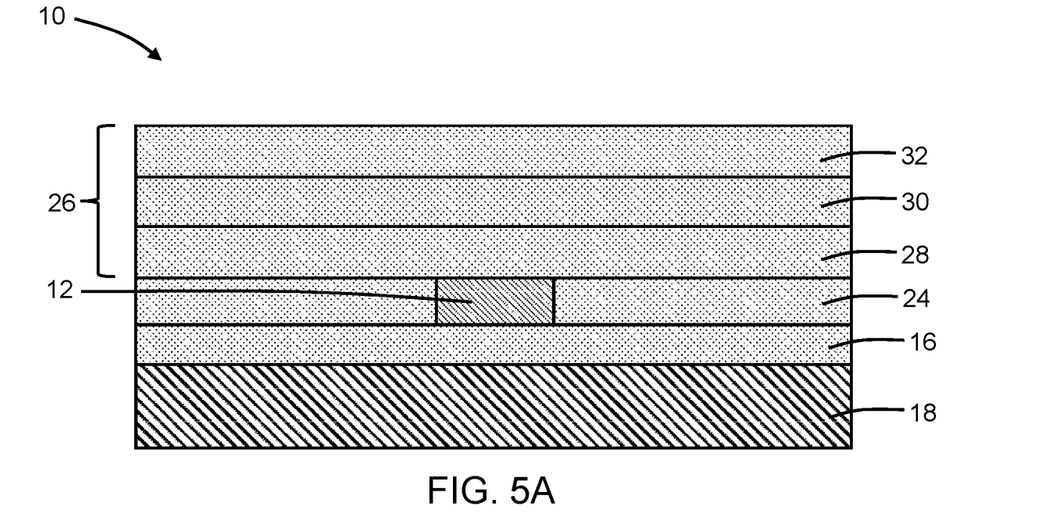
FIG. 5A is a cross-sectional view of the structure taken generally along line 5A-5A in FIG. 4.
Figure 5B:
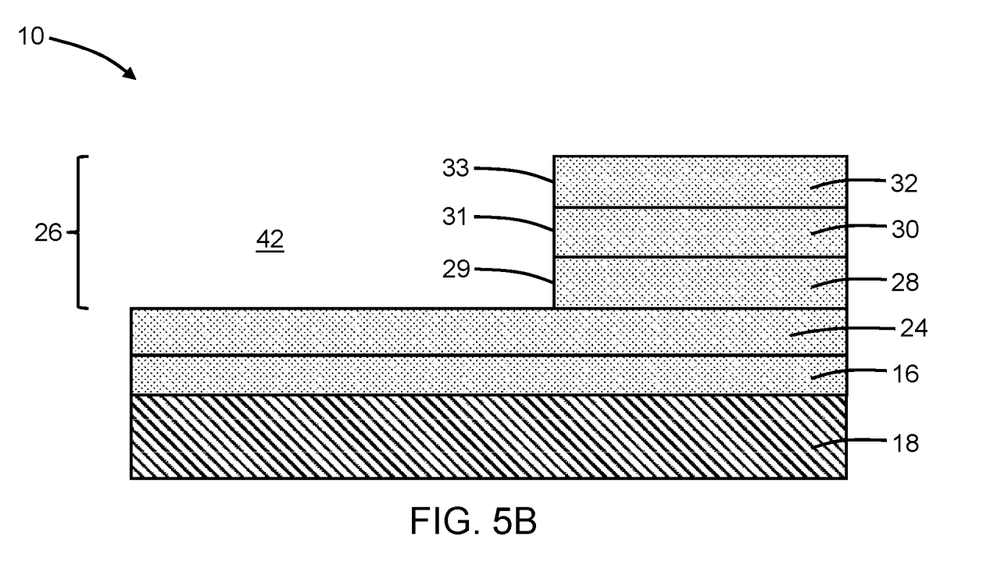
FIG. 5B is a cross-sectional view of the structure taken generally along line 5B-5B in FIG. 4.
Figure 6:
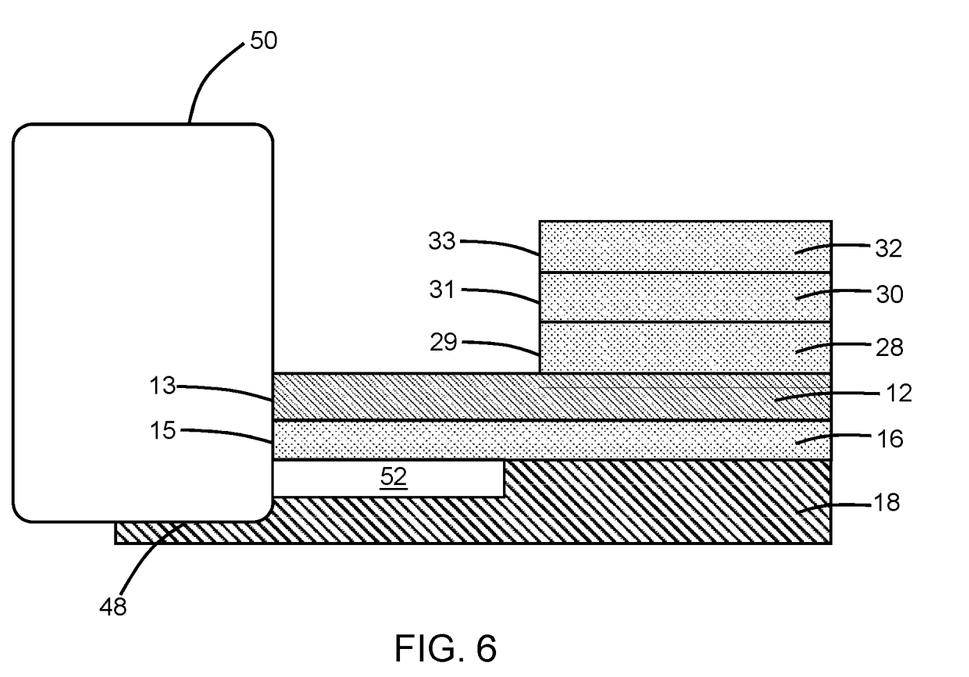
FIG. 6 is a cross-sectional view of the structure at a fabrication stage subsequent to FIG. 5.

With reference to FIG. 6 in which like reference numerals refer to like features in FIG. 5 and at a subsequent fabrication stage, a groove 48 penetrating through the dielectric layer 24 and dielectric layer 16 into the substrate 18 may be formed within a portion of the opening 42 by lithography and etching processes. The groove 48 may be formed by a multiple-step process culminating in a wet chemical etch characterized by etch rates dependent upon crystalline direction to endow the groove 48 with a V-shape or U-shape. The dielectric layer 16 has an edge surface 15 that is positioned adjacent to the groove 48. A portion of the waveguide core 12 may be etched and removed when the groove 48 is formed, which provides the waveguide core 12 with an end surface 13 that is positioned adjacent to the groove 48. The groove 48 may extend laterally in the substrate 18 beneath the dielectric layer 24 as an undercut 52 located under a portion of the waveguide core 12 adjacent to the end surface 13.

The structure 10, in any of its embodiments described herein, may be integrated into a photonics chip that includes electronic components and additional optical components. For example, the electronic components may include field-effect transistors that are fabricated by CMOS processing.

A tip of an optical fiber 50 may be inserted into the groove 48 and supported by the groove 48 adjacent to the end surface 13 of the waveguide core 12. A low-index adhesive may be used to assemble the tip of the optical fiber 50 to the photonics chip and may fill all or part of the groove 48 and/or undercut 52. The structure 10 may provide a fiber-to-chip coupler used for coupling light (e.g., laser light) between the optical fiber 50 and the optical components on the photonics chip.

Figure 4:
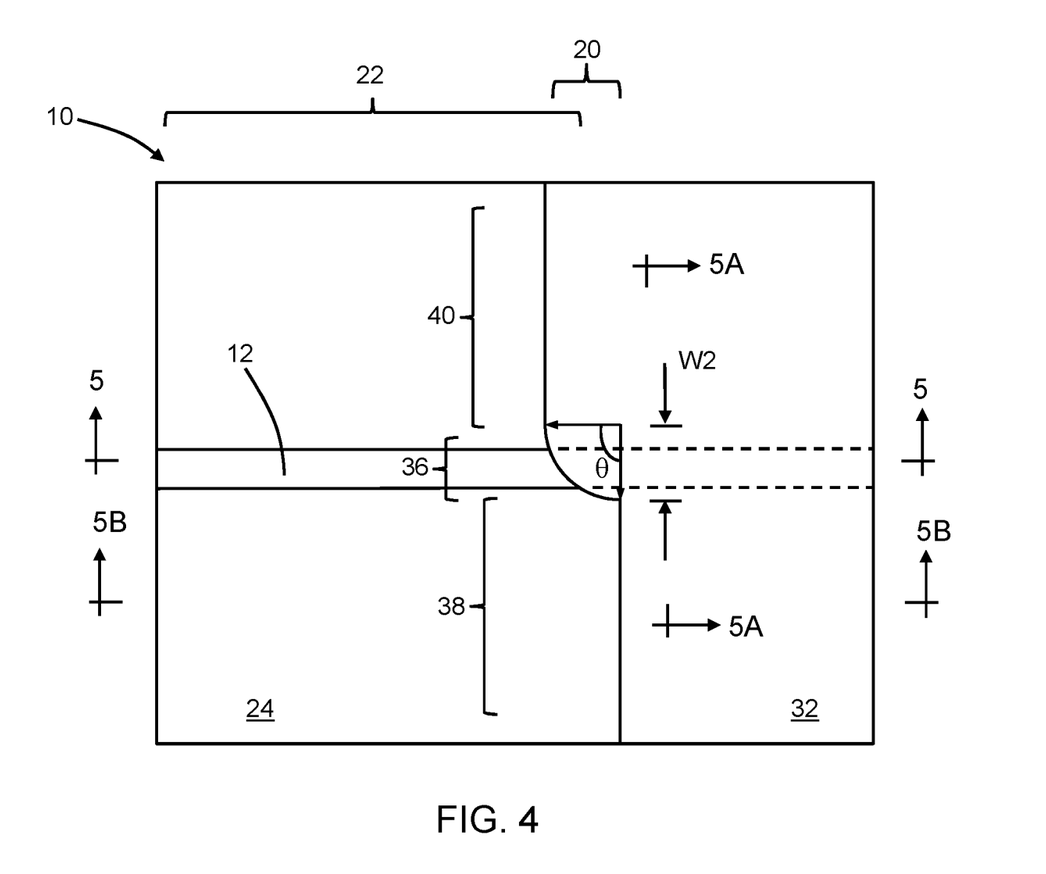
FIG. 4 is a top view of the structure at a fabrication stage subsequent to FIGS. 3, 3A.
Figure 7:
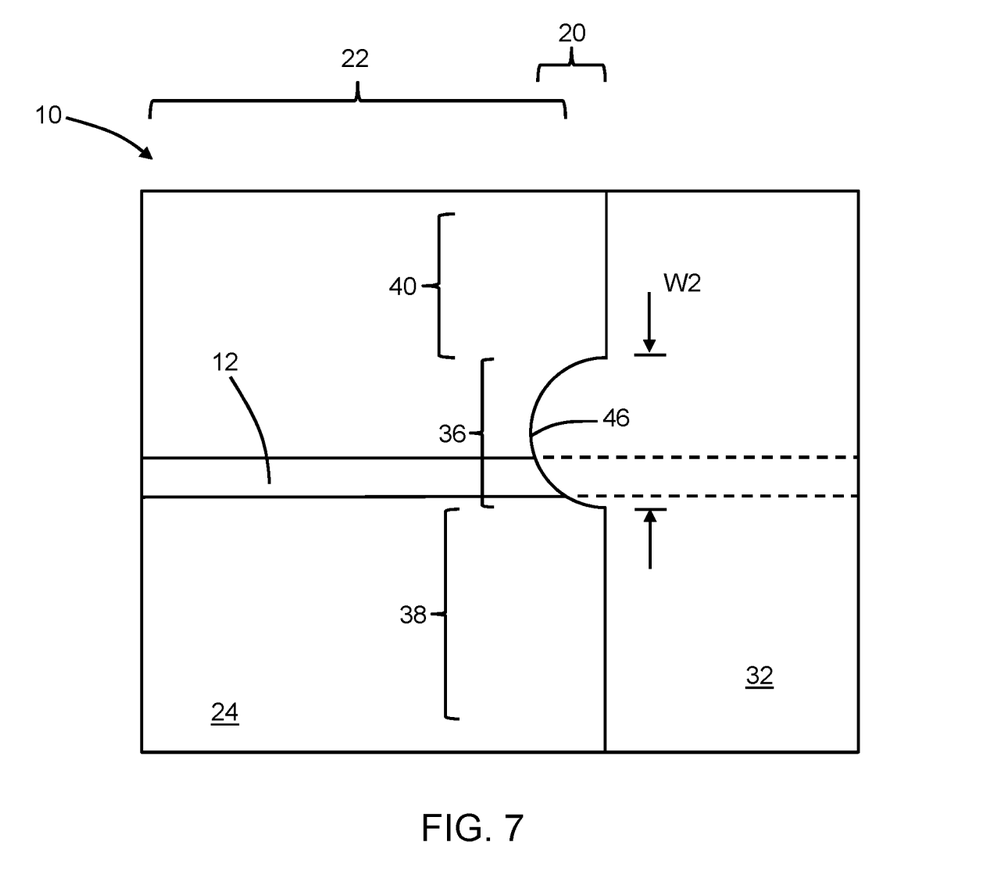
FIG. 7 is a top view of a structure in accordance with alternative embodiments of the invention.

With reference to FIG. 7 in which like reference numerals refer to like features in FIG. 4 and in accordance with alternative embodiments of the invention, the surfaces 29, 31, 33 of the rounded regions 36 of the patterned interlayer dielectric layers 28, 30, 32 may be altered to have a central angle with a different angular extent while maintaining a positive radius of curvature. In an embodiment, the central angle of the surfaces 29, 31, 33 of the rounded regions 36 may be equal to 180°. In an embodiment, the central angle of the surfaces 29, 31, 33 of the rounded regions 36 may be approximately equal to 180°. In an embodiment, each rounded region 36 may be characterized as a section of a cylinder. In an embodiment, the central angle of each rounded region 36 may range from about 90° to about 180°. In an embodiment, each rounded region 36 may be characterized as a sector of a right circular cylinder. In an embodiment, each rounded region 36 may be characterized as a sector of a right circular cylinder equal to one-half of an entire right circular cylinder. In an embodiment, each rounded region 36 may be characterized as a sector of a three-dimensional rounded shape different from a right circular cylinder.

The rounded region 36 is characterized by a turning point 46 at which the derivative of a function describing the curvature of the surfaces 29, 31, 33 of the rounded regions 36 is equal to zero. In an embodiment, the end surface 13 of the waveguide core 12 may be positioned beneath the rounded region 36 with a lateral offset relative to the turning point 46.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first dielectric layer;
a waveguide core on the first dielectric layer; and
an interconnect structure including a first interlayer dielectric layer positioned over the first dielectric layer and an opening penetrating through the first interlayer dielectric layer to the waveguide core, the first interlayer dielectric layer including a first rounded region positioned to overlap with a first portion of the waveguide core, and the first rounded region of the first interlayer dielectric layer having a first surface with a first curvature,
wherein the first portion of the waveguide core has a first width dimension, and the first rounded region of the first interlayer dielectric layer has a second width dimension that is greater than the first width dimension of the waveguide core.

2. The structure of claim 1 wherein the waveguide core includes a second portion adjacent to the first portion, and the second portion of the waveguide core protrudes from beneath the first rounded region of the first interlayer dielectric layer and is located inside the opening.

3. The structure of claim 2 further comprising:
a substrate including a groove, the groove having an undercut that extends beneath the first dielectric layer,
wherein the undercut of the groove is located under the second portion of the waveguide core.

4. The structure of claim 3 wherein the second portion of the waveguide core includes an end surface, and further comprising:
an optical fiber including a portion positioned in the groove adjacent to the end surface.

5. The structure of claim 2 wherein the waveguide core has a longitudinal axis, and the first portion and the second portion of the waveguide core are positioned along the longitudinal axis on opposite sides of the first surface.

6. The structure of claim 1 wherein the interconnect structure includes a second interlayer dielectric layer positioned on the first interlayer dielectric layer, the opening penetrates through the second interlayer dielectric layer to the waveguide core, the second interlayer dielectric layer including a second rounded region positioned over the first portion of the waveguide core, and the second rounded region of the second interlayer dielectric layer has a second surface with a second curvature.

7. The structure of claim 6 wherein the second curvature is substantially equal to the first curvature.

8. The structure of claim 7 wherein the first surface of the first rounded region of the first interlayer dielectric layer and the second surface of the second rounded region of the second interlayer dielectric layer each have a central angle that ranges from about 90° to about 180°.

9. The structure of claim 7 wherein the first surface of the first rounded region of the first interlayer dielectric layer and the second surface of the second rounded region of the second interlayer dielectric layer each have a positive radius of curvature.

10. The structure of claim 6 wherein the waveguide core has a longitudinal axis, the first portion and a second portion of the waveguide core are positioned along the longitudinal axis on opposite sides of the first surface, and the first portion and the second portion of the waveguide core are positioned along the longitudinal axis on opposite sides of the second surface.

11. The structure of claim 1 further comprising:
a second dielectric layer positioned between the first dielectric layer and the interconnect structure,
wherein the waveguide core is arranged in the second dielectric layer.

12. The structure of claim 1 wherein the first surface of the first rounded region of the first interlayer dielectric layer has a central angle that is substantially equal to 90°.

13. The structure of claim 1 wherein the first surface of the first rounded region of the first interlayer dielectric layer has a central angle that is substantially equal to 180°.

14. The structure of claim 1 wherein the first surface of the first rounded region of the first interlayer dielectric layer has a positive radius of curvature.

15. The structure of claim 14 wherein the first curvature of the first surface of the first rounded region of the first interlayer dielectric layer has a turning point, and the first portion of the waveguide core is laterally offset from the turning point.

16. The structure of claim 2 wherein the first rounded region is configured to alleviate damage to the second portion of the waveguide core when etching with reactive ion etching through the interconnect structure to form the opening.

17. A method comprising:
forming a waveguide core on a dielectric layer;
forming an interconnect structure including a first interlayer dielectric layer positioned over the dielectric layer; and
forming an opening penetrating through the first interlayer dielectric layer to the waveguide core,
wherein the first interlayer dielectric layer includes a first rounded region positioned to overlap with a first portion of the waveguide core, the first rounded region of the first interlayer dielectric layer has a first surface with a first curvature, the first portion of the waveguide core has a first width dimension, and the first rounded region of the first interlayer dielectric layer has a second width dimension that is greater than the first width dimension of the waveguide core.

18. The method of claim 17 wherein the interconnect structure includes a second interlayer dielectric layer positioned on the first interlayer dielectric layer, the opening penetrates through the second interlayer dielectric layer to the waveguide core, the second interlayer dielectric layer including a second rounded region positioned over the first portion of the waveguide core, the second rounded region of the second interlayer dielectric layer has a second surface with a second curvature, and the second curvature is substantially equal to the first curvature.

19. The method of claim 17 wherein the first surface of the first rounded region of the first interlayer dielectric layer has a central angle that ranges from about 90° to about 180°.

20. The method of claim 17 wherein the first surface of the first rounded region of the first interlayer dielectric layer has a positive radius of curvature.

* * * * *